United States Patent Office 3,371,392
Patented Mar. 5, 1968

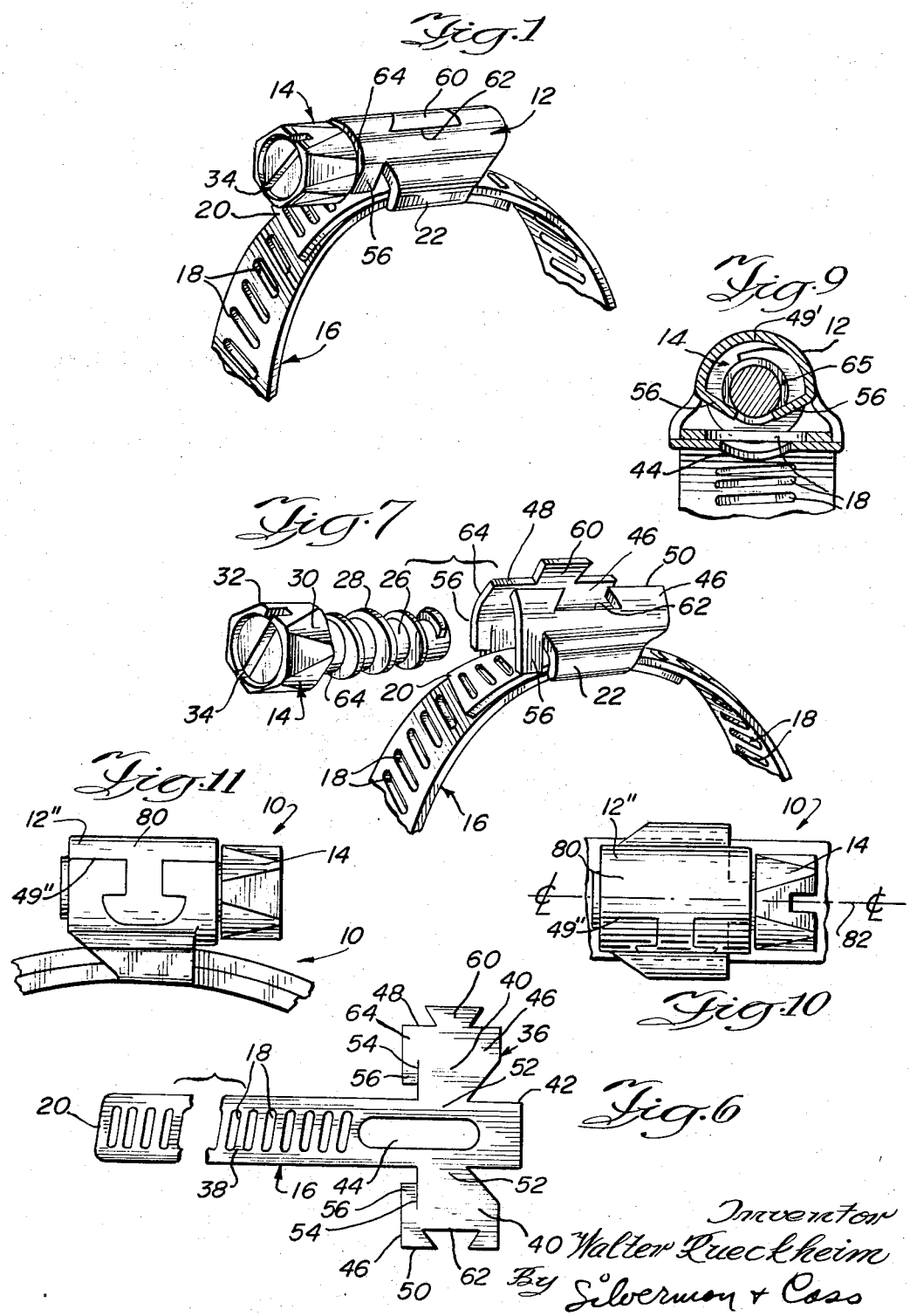

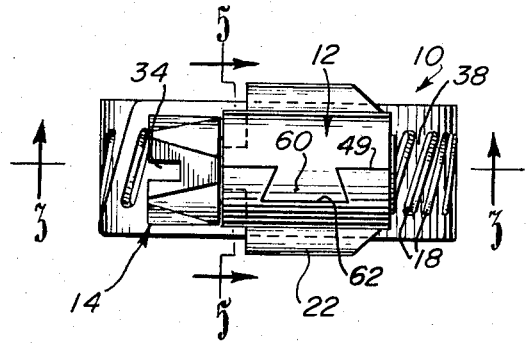
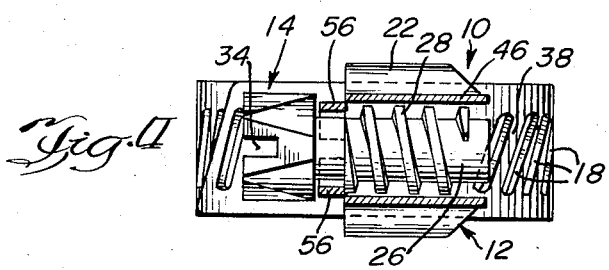
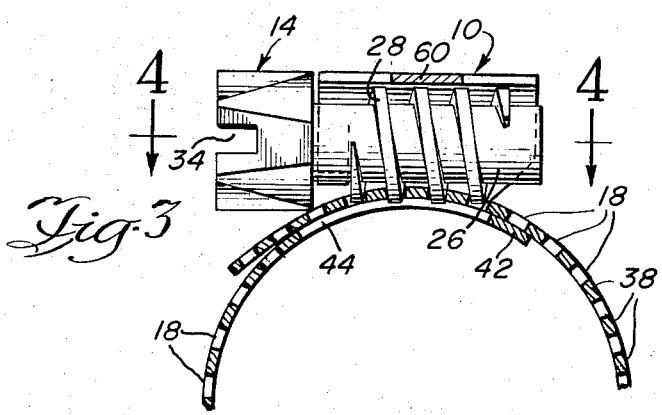
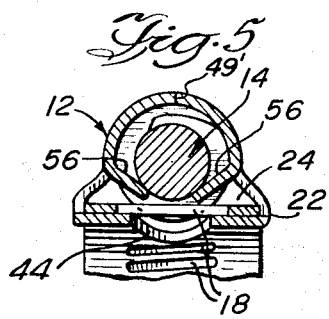
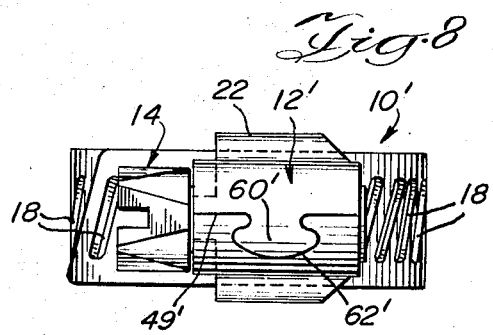

3,371,392
WORM DRIVE HOSE CLAMP
Walter Rueckheim, La Grange Park, Ill., assignor to Wittek Manufacturing Co., Chicago, Ill., a corporation of Illinois
Filed Feb. 21, 1966, Ser. No. 529,103
10 Claims. (Cl. 24—274)

ABSTRACT OF THE DISCLOSURE

A worm drive hose clamp of the type having a slotted band, a worm screw housing and means to retain a worm screw in the housing, the clamp being formed of a single member of sheet metal having lugs at one end thereof which extend laterally therefrom, the lugs being bent arcuately so that they join at their free edges to form the housing, the free edges of the lugs having cooperating dove-tail interlocking formations so that once engaged together, the free edges cannot come apart although they are not welded or otherwise deformed. Two tabs integral with the housing are bent behind the head of the screw to lock the same in place. In one embodiment, the line of juncture of the free edges of the lugs is coincidental with a plane passing through the center of the housing. In another embodiment described, the line of juncture is offset from the center of the housing providing an imperforate wall of the housing at the crown or top thereof.

---

This invention relates generally to hose clamps and more particularly is concerned with a novel hose clamp structure for use with a worm drive type of clamp.

Worm drive hose clamps which are in universal use each comprise a band having transverse slots or apertures along the majority of the length thereof, a housing secured to one end of the band, and a band-tightening screw of generally worm gear configuration disposed in the housing with its threads engaged in the slots. Turning the screw from the exterior of the housing causes the threads to translate the band by drawing the same through the housing in tightening the band upon a hose and pipe connection, or by pushing the same in an opposite direction through the housing to loosen the band. The benefits and advantages of the worm drive type of hose clamp are well-known and need not be dwelled upon at length, but among these are: the ability to achieve a tight connection with a clamp whose band has a free end to enable engagement without separating the hose and pipe; adjustability for any given size of clamp to a wide range of sizes; the use of a tangential screw giving convenient manipulation of the clamp, and many more.

Worm drive type hose clamps are disclosed in U.S. Patents 2,386,629 issued Oct. 9, 1945 to E. W. North et al., 2,395,273 issued Feb. 19, 1946 to F. L. Hill, et al., and 2,452,806 issued Nov. 2, 1948 to B. A. Tetzlaff. The first two of these patents describe a worm drive hose clamp in which the housing is formed of two pieces comprising a saddle base and cover member, the saddle base being attached to an end of the band by some interlocking arrangement and the cover member being secured to the saddle base by swaging tangs that protrude from the base through the cover member. The worm screw is laid into the housing before assembly.

The third patent described a worm drive hose clamp in which the housing is formed of a single member of metal which is formed to shape and spot-welded to the end of the band. The worm screw is led into one end of the housing and actually screwed past the entrance into position within the housing.

In all of the disclosed structures, after the housing and worm screw have been assembled, the free end of the band is inserted into a suitable channel formed in the housing below the screw and the screw turned in one direction to engage the slots formed in the band to pull the free end through the bottom of the housing somewhat in the manner of a worm and pinion connection. In this instance instead of the pinion there is a flat metal band having the webs between perforations meshing with the threads of the worm screw instead of gear teeth.

Also in all of these patented structures, the worm had a buttress thread and the slots were chord-shaped with the more radial face of the threads engaging the flat edges of the slots with the rotation of the screw pulling on such flat edges to afford the greatest strength for the band in tension. The slanted face of the threads conformed generally to the arcuate edges of the slots. The slots were clear-through in order to enable a substantial bite to be taken into the band.

Many hose clamps of these types have been made and are in use throughout the world, but for the most part these clamps are most effectively used where the minimum diameter of the circle into which the band will be bent is of the order of one inch or more. For miniature hose clamps the band is stiff and difficult to conform to a small pipe; the structures of these patents are difficult and expensive to make because of the need for tools to form and assemble including in some instances tools for entering into the interior of the housing, etc.; the formation of the housing in the case of the assembled structure occupies considerable space and protrudes; and it is difficult to handle the small pieces, even with automatic machinery.

The invention herein has as one of its principal objects to provide a hose clamp of the worm drive type in which the structure is especially adapted for the manufacture of miniature clamps, whereby to decrease if not fully to obviate the disadvantages and difficulties which attend the application of prior knowledge to the manufacture of miniature hose clamps. By miniature hose clamps it is intended to mean hose clamps whose final diameter is in most cases substantially less than one inch.

As will be seen, the invention herein may be applied to the manufacture of hose clamps which are larger than the miniature type mentioned above, but the structure of the invention is especially advantageous in the small hose clamps.

In accordance with the invention, the structure of the worm drive clamp described hereinafter is primarily characterized by the provision of a band and housing formed of a single integral member, suitably blanked by stamping, which is thereafter formed into a combined housing and band. The worm screw is mounted in the housing by inserting the same through an open end thereof and is locked in place by tabs which are also formed from the same member so that the structure is extremely simple and economical to manufacture and assemble.

An important object of the invention is to provide a worm drive hose clamp as characterized in the above paragraph in which the housing, band and means for retaining the worm drive screw within the housing are all formed from a single integral metal member.

Two types of worm drive hose clamps are disclosed in the prior art in which the band and means for mounting the worm screw are integrally formed. In one type the worm screw is journalled in a bearing member which in turn is secured to a pair of juxtaposed ears integral with the band. This obviously requires a third element, that is, the bearing member, and requires additional operations to mount the worm screw in the bearing member and the bearing member in the ears.

The second type of worm drive hose clamp has a transverse T-shaped end on the band forming a pair of oppositely extending lateral lugs. The lugs are bent into a form of a tunnel to house the worm screw and a cover member is mounted over the tunnel to hold the abutting edges of the lugs together and to form means for journalling the worm screw in the housing or tunnel. A modified form of this second type has the screw locked into the tunnel by means of a washer, thus eliminating the need for the cover member, but using welding to keep the abutting edges of the lugs in assembly. This structure, even in the case of the modified form comprises at least three members to assure keeping the worm screw mounted in the tunnel. Further added operations are needed to assemble the hose clamp.

According to the invention herein, band and housing are formed integrally from the same blank of sheet metal, and a pair of tabs are provided on the band which, after the worm screw is assembled into the formed housing, are bent to positions engaging the worm screw beneath its head so as to prevent withdrawal of the worm screw from the housing and obviating the need for end bearing means for the screw. The worm screw is closely held within the cylindrical portion of the housing so that, in effect, it is journalled within the housing by means of the outer circumference of its threads confined by said cylindrical portion. Further, the housing itself is provided with interlocking means to keep the housing in assembly in its configuration without the need for rivets or weldment. It will be seen that the structure described obviates the disadvantages of the prior art structures, and it is an important object of the invention to provide such a hose clamp.

Still a further object of the invention is concerned with providing structure in the hose clamp of the invention which will resist any tendency of the housing to be forced open when the housing is subjected to internal pressure by the worm screw during lightening of the band of the clamp.

In connection with the immediately above-stated object, when a worm drive hose clamp is tightened by turning the worm screw, as the resistance of the band to further movement through the housing increases, the threaded end of the screw tends to be forced out of engagement with the slots. This movement is upward, primarily, with some slight component in the direction the screw is being turned. As described hereinafter, the screw is journalled in the housing and there is pressure which is exerted outward of the axis of the hose clamp against the interior of the housing. The housing is thus stressed to force its enlargement, and the forces applied, in addition to tension, would include outward pressure at the point of engagement of the top of the screw with the housing. The tension disrupting force is resisted by the interlocking means referred to above. The radial disrupting force is opposed by a structure in which the interengaging edges of the chamber-forming portions of the lugs which are bent to make the housing are arranged offset from the center of the housing. In other words, the line of engagement of the chamber-forming portions is circumferentially spaced from the line of engagement of the worm screw with the inner surface of the housing so that the housing presents a substantially imperforate wall where it might otherwise be pushed outward. Such structure may require somewhat more complex tools and dies to manufacture and assemble but will result in a stronger hose clamp than one which has the line of engagement in the exact center of the housing.

The provision of the structure described with the offset juncture comprises another object of the invention.

It will be understood that the provision of an offset juncture is highly desirable in a hose clamp of this type, but in many cases the requirements are not so stringent that the structure with a central juncture is proscribed. Accordingly the invention is intended to cover both structures and variations thereof.

Many other objects and advantages will occur to those skilled in this art as a description of the invention is made hereinafter and in connection with which detailed drawings show a preferred embodiment of the hose clamp and its method of construction and assembly.

In the drawings:

FIG. 1 is a fragmentary perspective view showing a hose clamp constructed in accordance with the invention, the hose clamp being in assembled condition and ready for use.

FIG. 2 is a top plan view of the same.

FIG. 3 is a median sectional view taken generally along the line 3—3 of FIG. 2 and in the direction indicated.

FIG. 4 is a sectional view taken generally along the line 4—4 of FIG. 3 and in the direction indicated.

FIG. 5 is a sectional view taken generally along the line 5—5 of FIG. 2 and in the direction indicated.

FIG. 6 is a developed view showing the blank from which the band and housing are made.

FIG. 7 is a perspective exploded view showing the housing partially assembled and before the worm screw is installed into the housing.

FIG. 8 is a view similar to that of FIG. 2 but showing a modified form of the invention.

FIG. 9 is a view similar to that of FIG. 5 but showing modified form of the invention.

FIG. 10 is a fragmentary top plan view of a hose clamp constructed in accordance with a modified form of the invention.

FIG. 11 is a side elevational view of the structure of FIG. 10.

As indicated from the above discussion, the invention herein is characterized by the provision of a worm drive hose clamp having a slotted band, a housing and means to retain a worm screw in the housing, all integrally formed from a single blank of sheet metal suitably formed. The process of manufacture consists of stamping the entire blank having lugs at one end of the blank which extend laterally therefrom, then bending the lugs arcuately so that they join at their free edges and providing cooperative interlocking formations at the free edges so that once engaged together, these free edges cannot come apart although they are not welded or swaged or otherwise deformed. Thereafter the worm screw is inserted into the housing and two tabs integral with the housing are bent behind the head of the screw locking the same in place. This completes the construction of the worm drive hose clamp although the free end of the band may be threaded through the housing so that the hose clamp is generally formed into a loop when it is sold. Flexibility of the hose clamp is achieved by having the slots extend throughout the entire length of the hose clamp and also by having an elongate passageway or slot immediately beneath the housing, this latter passageway serving to enable clearance of the worm teeth in addition to providing needed flexibility at the end of the band closest to the housing.

The invention is also characterized by the provision, in certain forms thereof, of structure which provides for a juncture of the above-mentioned free edges on a line which is offset from the center of the housing in order that there be an imperforate wall of the housing at the crown or top thereof. The center of the housing which is mentioned may be considered as being a line on the housing which would lie approximately on a plane passing through the axis of the worm screw and being normal to the axis of the clamp loop. Accordingly a line offset from the center would lie on a plane passing through the screw axis, but being at an angle with axis of the clamp loop other than 90°. Greater strength is achieved through the use of such structure.

Referring now to the drawings, the reference character 10 designates generally the hose clamp of the invention, and, as previously stated, the construction of such hose clamp is especially suitable in the manufacture of hose clamps of very small size. As in the case of known worm drive hose clamps, the hose clamp 10 comprises a housing designated generally 12 in which there is journalled a worm screw designated generally 14. The housing is permanently mounted to one end of a flexible band designated generally 16, the said band being formed of sheet metal and provided with clear through slots 18 intended to engage with the threads of the worm screw, as will be described. The band 16 is bent in a loop and its free end 20 passes through a channel formation 22, the inside of which is conformed as shown at 24 in FIG. 5 to accommodate the band 16 as it moves through the housing 12.

With respect to the worm screw 14, this structure is best shown in FIG. 7. There is a shank 26 having the worm thread 28 formed thereon either by cutting or cold heading processes. Technically speaking, there is one thread helically provided on the structure shown, but multiple thread helices may be used. Reference will be made to "threads" hereinafter, but such usage is not intended to be limiting. The head 30 may be of any suitable configuration although it is preferred that there be a hexagonal end, as shown at 32, to enable the use of a small socket wrench to turn the screw. Additionally, there is a kerf 34 to permit the use of a screwdriver alternatively for driving the screw.

The threads 28 of the screw shown are cut in the form of a somewhat modified acme, that is substantially rectangular in cross section. Because of this the slots 18 have parallel side edges. If a buttress type of thread were used as, for example, in a larger hose clamp, one edge of the slots 18 could be arcuate. No limitation is intended by virtue of the example shown in the drawings.

As thus far described, the hose clamp 10 is generally conventional, and all of the advantages inherent in the use of hose clamps of this type attach thereto. The novelty of the invention is expressed in detail hereinafter.

In forming the housing 12 and the band 16, instead of producing the housing and band separately and thereafter joining them, the entire structure is made from a single piece of sheet metal. In FIG. 6, there is illustrated the developed blank which when bent and formed will produce not only the band 16 and housing 12 but, in addition, means for locking the worm screw 14 in place within the housing.

Looking at FIG. 6, the blank may be designated generally 36. The blank 36 comprises an elongate band portion 38 having the slots 18 cut therein, there being integral laterally extending lugs 40 adjacent the end of the blank 36 and a stub part 42 extending beyond the lugs 40 aligned with the band portion 38.

As laid out in FIG. 6, the left-hand end of the band portion 38 comprises what has previously been referred to as the free end 20 of the band. The slotted portion 38 when looped, as shown in FIGS. 1, 3 and 7, will form the band 16 of the hose clamp 10. Between the stub end 42 and the last slot 18, there is an elongate passageway 44 cut in the blank 36 at the position where the lateral lugs 40 are attached.

Each lug 40 has a cylindrical chamber-forming portion 46 adjacent its outermost lateral edge 48 and 50 respectively, the chamber-forming portion 46 being the widest parts of the respective lugs 40. The lugs taper to a rather narrow root at 52 where they join the band portion 38, this root 52 being, as will be seen, the only means of securement of the housing 12 to the band. It is narrowed at this point so that there will be flexibility alongside of the passageway 44 when the hose clamp 10 is curled into a very small loop. If the root 52 were the same width as the chamber-forming portions 46, there would be a tendency for the band 38 not to bend in a small arc.

Each of the lugs 40 has a cut 54 made normal to the long dimension of the band 38, this cut extending only part way to the free edges 48 and 50 of the respective lugs 40 so as to provide a tab 56 on the left-hand side, as viewed in FIG. 6, of each of the lugs 40. The free edges 48 and 50 are provided with means for interlocking the two lugs 40 in abutting edge to edge relationship when these lugs are arcuately bent to form the cylindrical chamber of the housing. Such interlocking means may comprise any form of necked protrusion on one edge and conforming notch or recess in the other edge. As shown in FIGS. 1 through 7, the necked formation on the edge 48 is an integral dovetail tongue 60 whose outermost dimension is substantially greater than its dimension at the place where it is integrally connected with the lug 40. The notch or recess is of conforming dovetailed configuration at 62. Both the protrusion or extension 60 and the notch 62 are formed in the blank 36 at the time of stamping the same. In forming the housing 12, suitable bends are made in the lugs 40 so that when the edges 48 and 50 are abutted, the channel 22 will be formed at the bottom of the housing. The butt joint formed is designated 49.

In FIG. 8, there is illustrated a hose clamp 10' whose construction is substantially the same as the hose clamp just described with the exception that in this case the interlocking means comprise a generally T-shaped extension 60' interlocked with the conforming recess 62' to provide the connection or coupling between the abutting edges of the housing 12'. A similar structure is shown in FIGS. 10 and 11.

Various kinds of interlocking means may be used, including tongues or extensions having rounded ends narrowing to necked connections with the edge 48; a plurality of tongues, either all on one edge or staggered and on opposite edges. Each tongue will have a mating recess opening to the opposite edge.

In FIG. 7, it will be seen that the two lugs 40 have been partially bent arcuately in the process of forming the housing 12. The necessary rectangular bends have been made to provide the channel portion 22 whereas the cylindrical chamber-forming portions 46 are partially bent but not yet joined edge to edge. It would be noted in this view that the free end 20 is shown passing through the channel formation 22 of the housing, but as a general rule, this condition will not prevail during the process of forming the housing 12. The band 38 is flat at this time, but in the view, in order to make the illustration easier to understand, the end has been shown pulled through.

After the interlocking means 60 and 62 have been engaged so that the edges 48 and 50 are tightly abutted, the resulting joint 49 will be as best shown in FIG. 2, in this form of the invention. Once interlocked, the housing is fully enclosed and provides the necessary cylindrical chamber for journalling the screw 14, as best shown in FIG. 4. A substantial part of the circumference of the screw 14 is thus confined. When turning the worm screw 14 to pull the free end 20 through the housing, the head 30 will bear against the end 64 of the housing, since this action tends to drive the worm screw 14 into the housing, that is to the right, as shown in the figures. When, however, it is desired to move the band 16 back through the housing to the right, as viewed in the figures, in removing the hose clamp or increasing its diameter, turning the worm screw 14 in the opposite direction tends to pull it out of the housing.

In order to prevent such withdrawal and thereby assure that the worm screw 14 is permanently retained within the housing 12, when the housing is fully formed as by continuing to bend of the lugs 40 to the cylindrical shape of the upper portion of the housing with the dovetailed extension 60 locked in its notch 62, the tabs 56 will be disposed somewhat as shown in FIG. 7. The worm screw 14 thereafter is engaged into the housing, this being readily accomplished by merely inserting it in place since the free end 20 is not disposed in the channel portion 22 as yet. After the screw is in place, the tabs 56 are pushed inwardly, being arcuately bent into engagement with the screw 14 on a portion 64 of the shank between the head 30 and the start of the threads 28. This portion of the shank is free of any threads and cooperates with the tabs 56 to prevent axial movement of the worm screw 14. The tabs are best shown bent into position in FIG. 5, such tabs 56 thereby serving as means to lock the worm screw 14 rotatable within the housing 12.

When the hose clamp is assembled as viewed in FIGS. 1, 2 and 3, the stub end 42 acts somewhat as a guide so that the free end 20 is readily inserted into the channel formation 22. The passageway 44 enables a very small arc to be formed in the band 16 without unnecessary distortion. In addition, as the worm engages the slots 18, threads will usually pass completely through the thickness of the band portion 38 and protrude slightly as indicated in FIG. 3 so that this passageway 44 provides sufficient clearance for free operation of the worm screw 14.

In some parts of the world, instead of using slots such as shown, that is perforated fully through the band portion 38, the band portion 38 may be somewhat thicker than indicated, and the slots are milled, that is cut as grooves in the band without passing completely through. Obviously the invention is equally applicable to this type of structure and hence is not to be limited to a hose clamp with clear-through slots.

In accordance with the discussion hereinabove, the blank 36 is stamped out of relatively thin sheet metal and hence may be fully formed in the flat by automatic punch press operation. Forming the housing and the means for locking the screw into place may be done in forming jigs and also automatically. There are no welds, rivets or extraneous fastening means of any kind used to construct the band 16 with its housing 12 and the screw locking means 56. The only operation required to install the worm screw 14 is simply bending the tabs 56 inwardly after the screw has been put into the housing 12.

It is pointed out that the abutting edges 48 and 50 were welded together in one early example of clamp made according to the invention, but such expedient is not required in the preferred embodiments. If desired, the screw shank 64 may be grooved adjacent the head as shown in FIG. 9 at 65 to receive the tabs 56, such groove being just slightly larger in axial dimension than the width of the tabs. Alternatively, or in addition the rearmost thread may be rounded at its extreme end to prevent its catching on the tabs 56 when the screw 14 is being turned in reverse.

As thus far described, the laterally extending lugs 40 are substantially equal in lateral dimension so that when their chamber forming portions 46 are bent to form the generally cylindrical chamber of the housing 12, the edges 48 and 50 engage tightly along the butt joint 49. The screw 14 is journalled in the housing 12 and hence the housing walls will be required to withstand the lateral bearing pressure of the screw. As will be understood by reference to FIG. 3, if great resistance to turning of the screw is exerted by the band, the tendency of the screw threads 28 will be to ride out of the slots 38 within the housing 12. The right hand end of the screw will bear against the inside of the upper end of the housing. This occurs in the structure described thus far, at the butt joint 49, so that, in addition to the tension exerted on the joint 49 tending to pull the engaged tongue 60 and notch 62 apart, there are upward forces exerted against the butt joint 49 on the inside thereof. These forces are approximately the reverse of the forces used to bring the edges of the joint together so that the housing 12 may be considered as having localized disrupting forces exerted at the joint 49.

In FIGS. 10 and 11, a hose clamp structure 10" is illustrated which is constructed in such a way as to provide a substantial resistance to such disrupting forces. Instead of having the two lugs 40 equal in lateral dimension, in the blank formed (not shown) the lug having the recess similar to 62 is much smaller than the other lug having the tongue 60. This distance may be measured from the edge of the band 38 to the respective free edges 48 and 50. When bent to form the housing 12", as shown in FIGS. 10 and 11, the resulting joint 49" occurs offset from the center of the housing 12". The top or outer crown of the housing is solid, i.e., free of any joints as best seen at 80 in FIG. 10. The center line 82 in FIG. 10 has been illustrated to indicate where a plane passing through the screw axis and normal to the axis of the loop of band 16 will cut the housing 12". The new butt joint 49" is displaced substantially from the center although still parallel to the screw axis. It may be considered as being in a lateral or side wall of the housing 12". It lies on a plane passing through the screw axis, but an at angle to the axis of the loop other than 90°. The axis of the loop of band 16 would be of course, the axis of a perfectly cylindrical pipe around which the hose clamp 10" is engaged.

This imperforate, solid wall 80 has great strength and no tendency to disrupt. The location of the butt joint 49" is counter-clockwise of the center line 82, considering the tightening movement of the screw 14 to be clockwise, or perhaps put in a better way, in the lateral wall opposite that toward which the worm is turned in tightening the band. One component of the disruptive forces applied by the screw 14 against the inside of the housing 12" tends to move the screw to the clockwise side of the center line, so that even if the line of application of the major disruptive force shifts substantially, there will still be a solid, jointless resisting wall.

In FIGS. 10 and 11, the configuration of the tongue 60" and recess 62" is somewhat different from both previously described. In this case there is a narrow necked portion 84 somewhat more positively defined so that the enlarged portion of the tongue 60" is spaced substantially from the joint 49".

Modifications will occur to those skilled in the art without departing from the spirit or scope of the invention as defined in the appended claims.

What it is desired to secure by Letters Patent of the United States is:

1. A worm drive hose clamp having an elongate slotted band, a worm screw housing having open ends and a base portion opposite said open ends, the base portion secured to one end of the band, said housing comprising a pair of lugs respectively extending laterally from opposite edges of the band and reverse bent from said edges in arcuate configuration, the free edges of said lugs meeting in an edge-abutting juncture, the edge-abutting juncture having necked tongue and conforming recess means for interlocking the said free edges together, including a channel formation adjacent the base and a substantially cylindrical chamber formation adjacent the channel formation, the second end of the band adapted to be looped through the channel formation and pulled through the housing in tightening the band upon a hose connection or the like, a worm screw disposed in the housing journalled in the chamber formation and having threads adapted to be engaged with the slotted band when same is within the channel formation and means for locking the worm screw within the housing; the housing, band and locking means all being formed from a single member of sheet metal, and edge portions at one of said open ends bent inwardly to engage a groove in said worm screw to form said locking means for holding said worm screw in said housing.

2. A structure as claimed in claim 1 in which said juncture is disposed in a plane which passes through the axis of the screw and makes an angle with the axis of the loop other than 90°, whereby to provide a portion of said housing free of joints at the outermost crown of the housing, the juncture being offset therefrom.

3. A sheet metal blank for forming a hose clamp band, housing and locking tabs, which comprises a flat elongate slotted band portion having laterally extending lugs at one end, the lugs being normal to the band portion and each having a free outer edge and having a length measured from their juncture with the band portion to the respective edges which, when curved toward one another with the free edges abutting, will form a generally cylindrical worm screw housing and a channel formation of a size and configuration to pass the looped free end of said band portion, each lug having a tab formed thereon perpendicular to the long dimension of the band and having a free end extending toward the band portion, the tabs adapted to serve as screw locking means when the housing is formed, said free edges respectively having cooperating necked tongue and conforming recess interlocking means so that when so abutted the free edges will be locked together.

4. A sheet metal blank as claimed in claim 3 in which the junctures of the lugs with the band are less in length than the outer width of the lugs.

5. In a worm drive hose clamp having an elongate slotted band adapted to encircle a pipe or the like and form a circular loop thereby, a worm screw housing having open ends and a base portion opposite said open ends, the base portion being secured to one end of the band, the opposite end of the band being bent in said loop and engaged through one end of the housing, a worm screw journalled in the housing tangentially of said loop and having its thread enmeshed with said slots and adapted to be rotated from the exterior of said housing at the second end of the housing to pull the said opposite end through the housing, means for locking the worm screw within the housing, the invention herein which comprises: the housing being formed from lugs attached to opposed lateral edges of said one end of the band and reverse bent from said edges in arcuate configuration, the free edges of said lugs meeting in an edge-abutting juncture and having a partially cylindrical configuration providing the journal for said screw, the edge-abutting juncture having necked tongue and conforming recess means for interlocking the said free edges together, edge portions at one of said open ends bent inwardly to engage a groove in said worm screw to form said locking means for holding said worm screw in said housing, said housing, band and locking means all being formed from a single member of sheet metal.

6. A structure as claimed in claim 5 in which the band has a passageway in the base of said housing to provide flexibility for the band and to enable tips of worm teeth of said screw to extend past the second end of the band passing through the housing without interference.

7. A structure as claimed in claim 5 in which the worm screw locking means engages beneath a head of the screw when said screw is installed in said housing.

8. The structure as claimed in claim 5 in which the juncture lies in a plane which passes through the axis of the screw and makes an angle with the axis of the loop other than 90°, whereby to provide a portion of said housing free of joints at the outermost crown of the housing, the juncture being offset therefrom.

9. The structure as claimed in claim 8 in which the juncture is on a side wall which is opposite to the side toward which the worm is turned in tightening the band.

10. The structure of claim 5 in which the juncture lies in a plane which passes through the axis of the screw and is normal to the axis of the loop.

References Cited

UNITED STATES PATENTS 2,825,113  3/1958  Schaefer  24—274

FOREIGN PATENTS 1,008,465  2/1952  France.
526,139  9/1940  Great Britain.
682,935  11/1952  Great Britain.
914,349  1/1963  Great Britain.

BERNARD A. GELAK, *Primary Examiner.*

JAMES L. JONES, JR., *Examiner.*